(12) United States Patent
Grosche et al.

(10) Patent No.: US 6,176,454 B1
(45) Date of Patent: Jan. 23, 2001

(54) APPARATUS FOR INFLUENCING THE FLOW SEPARATION FROM A BODY IMMERSED IN THE FLOW

(75) Inventors: Fritz-Reinhard Grosche; Viktor Bader, both of Göttingen (DE)

(73) Assignee: Deutsches Zentrum fur Luft-und Raumfahrt e,V, Bonn (DE)

(*) Notice: Under 35 U.S.C. 154(b), the term of this patent shall be extended for 0 days.

(21) Appl. No.: 09/133,858

(22) Filed: Aug. 13, 1998

(30) Foreign Application Priority Data

Aug. 14, 1997 (DE) ............................................. 197 35 269

(51) Int. Cl.[7] ............................. B64C 21/04; B64C 21/06
(52) U.S. Cl. ......................................................... 244/208
(58) Field of Search ........................................ 244/208, 204, 244/207, 209, 35 A

(56) References Cited

U.S. PATENT DOCUMENTS

| | | | |
|---|---|---|---|
| 2,783,008 | 2/1957 | Bodine, Jr. ........................... | 244/130 |
| 4,630,997 | * 12/1986 | Cousteau et al. ........................ | 416/90 |
| 4,664,345 | * 5/1987 | Lurz ....................................... | 244/209 |
| 4,697,769 | * 10/1987 | Blackwelder et al. ............ | 244/207 X |
| 4,991,433 | * 2/1991 | Warnaka et al. ........................ | 73/290 |
| 5,417,391 | * 5/1995 | Savitsky et al. ...................... | 244/199 |

FOREIGN PATENT DOCUMENTS 0 264 144    8/1987  (DE).
2051956     4/1971  (FR).

* cited by examiner

Primary Examiner—Robert P. Swiatek
(74) Attorney, Agent, or Firm—Womble Carlyle Sandridge & Rice

(57) ABSTRACT

An apparatus serves for influencing the separation of a flow 2 from a body 1 immersed in the flow. The apparatus excites a shear layer 11 of the flow 2 at the immersed body 1 by periodic blowing and suction in order to act against further separation of the shear layer 11 from the immersed body 1. For this purpose, the apparatus has at least one passive cavity resistor 46, the hollow cylinder 4 of which has at least one opening 6 leading to the surface 10 of the body 1. The cavity resonator 46 is excited by the flow 2 thus creating compressional vibrations, and the compressional vibrations of the cavity resonator 46 excite the shear layer 11.

9 Claims, 3 Drawing Sheets

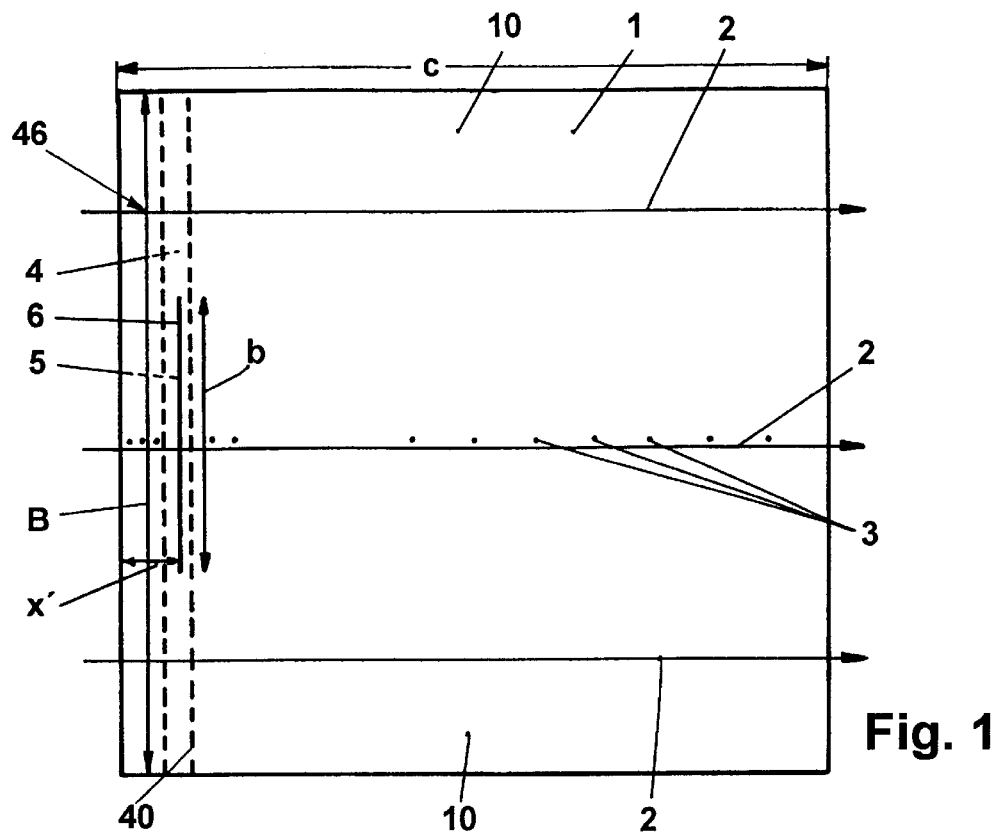
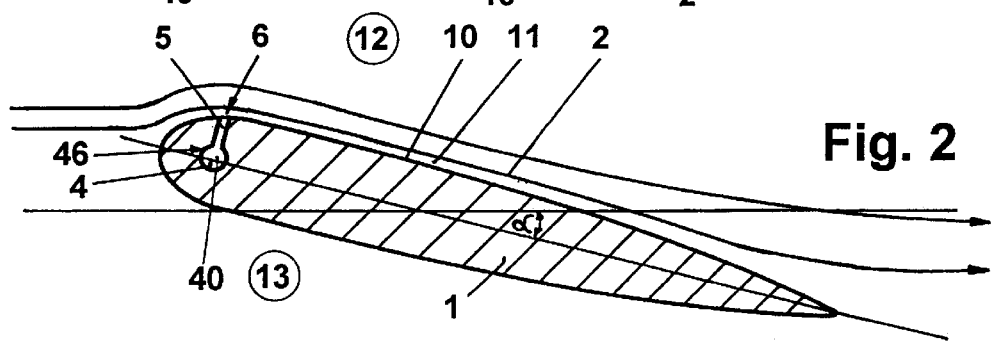
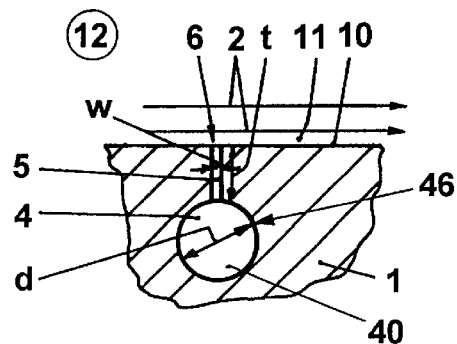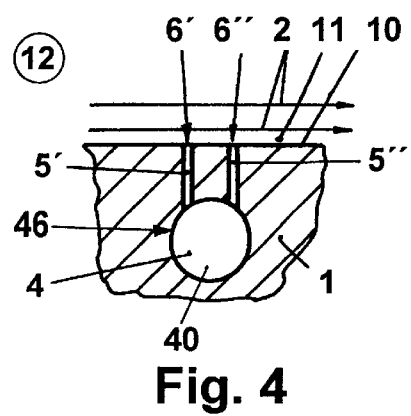

APPARATUS FOR INFLUENCING THE FLOW SEPARATION FROM A BODY IMMERSED IN THE FLOW

FIELD OF THE INVENTION

The invention relates to an apparatus for influencing the separation of a flow from a body immersed in the flow, by which a shear layer of the flow at the body immersed in the flow is excitable by means of periodic blowing and suction in order to act against a further separation of the shear layer from the body immersed in the flow.

The wing of an airplane or the rotor blade of a helicopter or the impeller blade of a compressor, for example, can be applied as the body immersed in the flow.

BACKGROUND OF THE INVENTION

An apparatus of the type described above is known from EP 0 264 144 A2. Several cavities are arranged under the surface of the body immersed in the flow. Each cavity has an opening leading to the flow at the body immersed in the flow. A loudspeaker is positioned at the edge of each cavity, with which compressional vibrations can be created in the cavity. As a consequence of the compressional vibrations in the cavity, the flow medium, i.e. generally air, enters and leaves through the opening in the cavity. In this way, the flow at the immersed body is exited by means of blowing and suction. As a consequence of this excitation, the complete flow separation from the immersed body is delayed. This means that it results only at a larger angle of incidence and/or at lower speeds of the immersed body relative to the flow, i.e. at lower Reynolds' numbers. However, the known apparatus is complex in construction. Equipment includes not only the cavities and the loudspeakers but also an energy supply to the loudspeakers must be provided.

It is the object of the invention to provide an apparatus with extremely simple construction for influencing the separation of a flow from a body immersed in the flow, which can be realized at low costs.

SUMMARY OF THE INVENTION

The Invention provides an apparatus for influencing the separation of a flow from a body immersed in the flow, by which a shear layer of the flow at the body immersed in the flow is excitable by means of periodic blowing and suction in order to act against a further separation of the shear layer from the body immersed in the flow; said apparatus comprising at least one cavity in the immersed body, which has at least one opening leading to the surface of the body and which is part of a passive cavity resonator, said cavity resonator being passively excited to create compressional vibrations by the flow and said compressional vibrations of the cavity resonator exciting the shear layer.

In fulfilment of its object, the invention does not possess loudspeakers or any other active component for creating compressional vibrations in the cavity. The compressional vibrations in the cavity resonator, which is in accordance with the invention at least partially formed by the cavity, are created rather by the flow which is to be influenced itself. The compressional vibrations of the cavity resonator created by the flow over the opening lead, as a result, to the desired excitation of the shear layer of the flow at the immersed body by means of blowing and suction. In terms of the invention, it therefore suffices to provide cavities and to construct them as parts of passive cavity resonators in order to attain the desired influence of the flow separation from the body immersed in the flow. Neither loudspeakers nor any other active elements or energy supply to these active elements are required. Nevertheless, by application of the invention a significant influencing effect on the flow separation from the body immersed in the flow is attained. Therefore, the maximum angle of incidence of a NACA 0012 profile, for example, can be increased by several degrees. This is to be considered as absolutely astonishing in consideration of the expense which is incurred with respect to active excitation of the shear layer and which only leads to the same degree of influence on flow separation from the body immersed in the flow.

The appropriate cavity for the new apparatus may have a completely enclosed design with the exception of the openings leading to the free shear layer in order to make possible, in an especially simple manner, the defined build up of compressional vibration.

The opening of the cavity leading to the surface of the body may constitute in a slot transverse to the direction of flow of the flow. The slot can be interrupted by bars along the main course of direction of the opening in order to maintain the stability of the surface of the body immersed in the flow. It is also, however, possible that a row of individual holes with circular cross-sectional shapes, for example, runs transversely to the direction of flow of the flow and forms the openings of the cavity leading to the surface of the body. In concrete applications, the most advantageous shape is dependent on the relative size of the cavity resonators. Moreover, the flow conditions may vary decisively in a direction, as for example along the span of a rotor blade, and can require differently shaped cavity resonators along this direction in order to excite the shear layer optimally.

A cavity resonator preferred for the new apparatus includes a hollow cylinder arranged as a cavity transversely to the direction of flow of the flow.

If the cavity has several openings, these can lead to the surface of the body in at least two areas directly behind each other with respect to the direction of flow of the flow. In this case, they can be designed as the openings of two slots leading to a common hollow cylinder. The openings leading to the surface of the body at areas directly behind each other with respect to the direction of flow have the advantage that the excitation of the cavity resonator can be effected by the flow in the one area in which the flow shows more intensive pressure fluctuations or a higher speed and, as a consequence, makes possible a stronger excitation of the cavity resonator, whereas the excitation of the shear layer of the flow on the body immersed in the flow is created by the pressure fluctuations of the cavity resonator primarily in another area in which the influence on flow separation by alternating suction and blowing is particularly effective.

Preferably, at least a portion of the openings of the cavity resonator is to be located where the free shear layer of the flow begins to separate or has just separated from the body immersed in the flow. At this point, the influence on the shear layer of the flow is especially effective for influencing the characteristics of separation from the body immersed in the flow.

If, for example a wing is applied as the body immersed in the flow, the openings of the cavity resonator can, in concrete terms, be prescribed at a chord length x' with x'/c=0.005 to 0.050, where c is the length of the body immersed in the flow. These specifications relate especially to the NACA profile of approx. NACA 0012. Of essence is the fact that the openings are located as close as possible to the separation point of the shear layer which is dependent on the profile shape of the body immersed in the flow and the flow conditions.

Additional openings of the cavity resonator can be located at a distance of x' with x'/c=0.010 to 0.100 in the direction of flow behind the openings at x' with x'/c=0.005 to 0.050. This area is located characteristically behind the starting points of a flow separation from the body immersed in the flow and the flow is especially suitable for a strong excitation of the cavity resonator, here.

The resonance frequency of the cavity resonator can be in the frequency range of the natural instability frequency of the free shear layer, the first subharmonic of the natural instability frequency of the free shear layer, or a tenth of the natural instability frequency of the free shear layer. These frequencies are especially well suited for excitation of a shear layer for the purpose of preventing the flow separation from a immersed body by a flow.

When tuning the cavity resonator to the above-mentioned specified frequency ranges, the resonance frequency of the cavity resonator can be determined as the resonance frequency of a Helmholtz resonator or analogue to a Lambda/2 resonator vibrating transversely or vertically to the direction of the flow of the flow. As a result, extreme differences in dimensions can be produced of cavity resonators optimally tuned for individual cases. In the case of a rotor blade, cavity resonators located adjacent to each other with respect to the main course of direction of the rotor blade are formed differently for optimal tuning. All concrete examples presented here for cavity resonators are, therefore, to be considered with the reservation that they are tuned to certain flow conditions.

BRIEF DESCRIPTION OF THE DRAWINGS

With reference to the enclosed drawings, the invention is now explained and described in greater detail by means of preferred embodiments, wherein FIG. 1 is a top view of a measurement arrangement for examining the effect of the new apparatus on a NACA 0012 profile shown as top view, FIG. 2 is a cross sectional view of the measurement arrangement of FIG. 1, FIG. 3 is a detail of the cross section of FIG. 2, FIG. 4 is a detail corresponding to FIG. 3 of a second embodiment of the apparatus.

DESCRIPTION OF THE PREFERRED EMBODIMENTS

Figure 5:
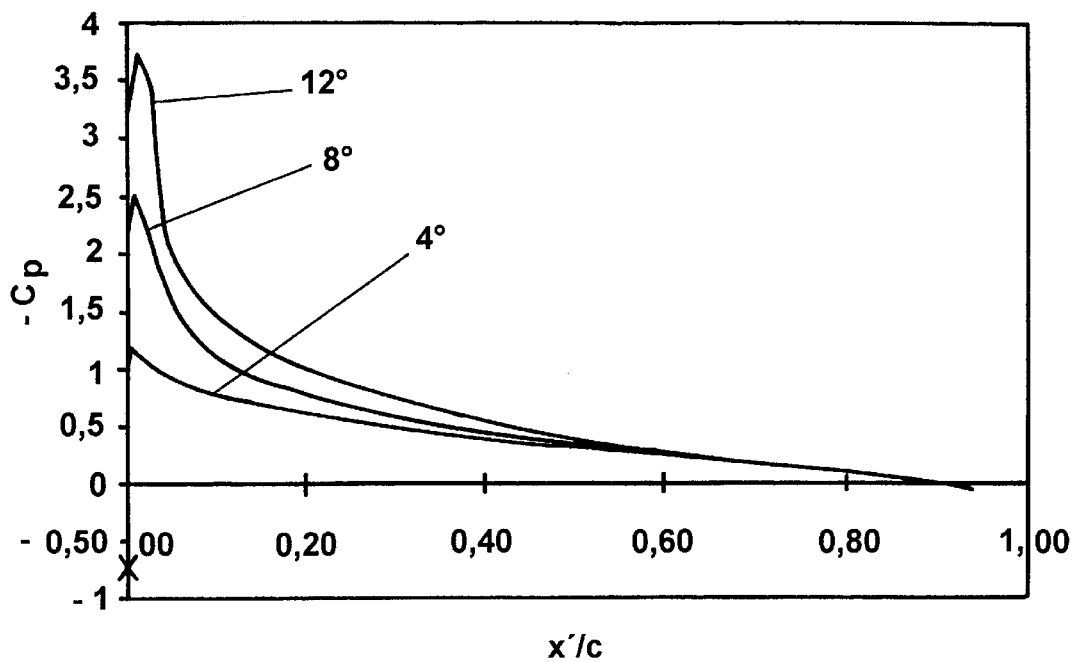
FIG. 5 is a pressure distribution on the suction side of the NACA 0012 profile for an angle of incidence of 4°, 8° and 12° at a Reynolds' number of Re=6.9×10$^5$.

FIGS. 1 and 2 show a NACA 0012 profile as an example for a body 1 immersed in a flow 2. The flow is represented by arrows 2. The flow 2 forms a shear layer 11 at the surface 10 of the body 1 immersed in the flow. A series of pressure drillings 3 directly behind each other is provided in body 1 immersed in the flow in order to determine the pressure distribution on the suction side of the NACA 0012 profile. For the NACA 0012 profile, a suction side 12 and a pressure side 13 of the body 1 immersed in the flow is defined solely by an angle of incidence a of the profile with respect to the flow 2. The suction side 12 for the NACA 0012 profile represents the side of the body 1 immersed in the flow, at which the body being inclined away from the flow 2 at angle of incidence $\alpha$.

The apparatus in accordance with the invention for influencing the flow separation 2 from body 1 immersed in the flow consists of a cavity resonator 46 in accordance with FIGS. 1 and 2.

The cavity resonator 46 consists of a hollow cylinder 4 and a slot 5, the opening 6 of which leads to the surface 10 of the body 1. The opening 6 of the cavity resonator 4 to 6 is located in the direction of flow at x' with x'/c=0.013. This means it is provided after 13/1.000 of the length c of the body 1 immersed in the flow. In this case, this represents the critical area, in which a flow separation 2 from the body 1 immersed in the flow begins at a larger angle of incidence and/or lower flow speeds.

The cavity resonator 46 is represented as a blowup in FIG. 3. The slot 5 and the opening 6 have a width w of 0.5 mm and a vertically running breath b with respect to the drawing plane of 120 mm. The depth t of slot 5 and the diameter d of the hollow cylinder 4 are 10 mm. The hollow cylinder 4 has a vertically running breath B with respect to the drawing plane of 300 mm which extends over the total body 1 immersed in the flow in accordance with FIG. 1.

On assuming an ideal Helmholtz resonator, the resonance frequency $F_R$ of the cavity resonator 46 is equal to:

$$F_R = v_s * \sqrt{(A/(T*V_o))}$$

For the formula, $v_s$ is the velocity of sound, $V_o$ is the volume of the hollow cylinder 4, A the area of the cross section of slot 5 and the opening 6 respectively and t the depth of the slot 5. On calculating from the above given values $V_o$ is equal to 23,600 mm$^3$ and A is equal to 60 mm$^2$. This results in a resonance frequency $F_R$ of approx. 5,400 Hz.

If one considers the hollow cylinder 4 as Lambda/2 resonator, in which the width B corresponds to half the wave length of the first fundamental oscillation, the fundamental resonance frequency $F_{GR}$ of the cavity resonator 46 is equal to $2v_s/B=550$ Hz and the harmonic vibration of the cavity resonator shows frequencies of n*550 Hz.

All these resonance frequencies lie within the frequency range of the instability frequency (Kelvin-Helmholtz Instability) or the first subharmonic of the instability frequency of the free shear layer, respectively, with the Reynolds' number being in the range of Re=10$^5$ to 10$^6$. The instability frequencies can be determined by hot wire measurements on the body immersed in the flow.

In concrete terms, the excitation of the cavity resonator 46 was observed for the slot at location x'/c=0.013 analogous to a Lambda/2 resonator. For an equal cavity resonator with a slot however at location x'/c=0.050, an excitation analogous to a Helmholtz resonator was observed. In this case, the compressional vibrations in the cavity resonator 46 had a larger amplitude than for x'/c=0.013.

This fact is taken advantage of in the case of the shape of the cavity resonator 46 in accordance with FIG. 4, which proves especially beneficial for certain flow speeds and angles whereas at higher flow speeds and greater angles, only the slot positioned far to the front has proven to be advantageous for the targeted excitation of the free shear layer. In accordance with FIG. 4, two slots 5' and 5" are directed from the hollow cylinder 4 to the flow 2. In this case, the opening 6' of the slot 5' is provided at location x'/c=0.013 and the opening 6" of the slot 5" is provided at location x'/c=0.050. For this constellation, the compressional vibrations in the cavity resonator 46 are excited essentially by the reciprocal action of the flow with the opening 6" of the slot 5" whereas the compressional vibrations trigger their primary action over opening 6' of slot 5' by exciting the shear layer 11 of the flow 2 at this point.

An active component which creates compressional vibrations in the cavity resonator 46 is not provided for the apparatus. The excitation of the compressional vibration of the cavity resonator 46 is effected by pressure fluctuations in the flow 2 and/or flute-like cutting action of the flow directed edges of the openings to the surface of the body immersed in the flow. Nevertheless, considerable delays in the separation of flow 2 from body 1 immersed in the flow are attained. This is clearly shown in FIGS. 5 to 6.

Figure 6:
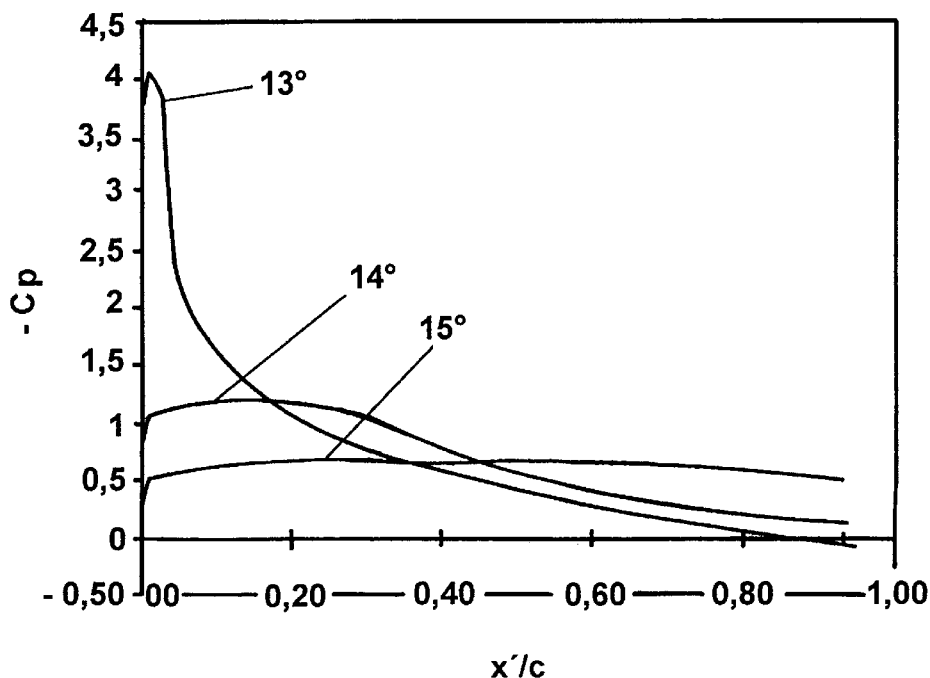
FIG. 6 is a pressure distribution on the suction side of the NACA 0012 profile for an angle of incidence of 13°, 14° and 15° at a Reynolds number of Re=6.9×10$^5$.

FIG. 5 illustrates the change in the pressure distribution on the suction side of the profile with increasing angle of incidence for a NACA 0012 profile. The attainable negative pressure coefficient −Cp rises with the increase in the angle of incidence. The maximum negative pressure on the suction side is produced shortly before the flow separation from the body immersed in the flow, i.e. shortly before reaching the critical angle of incidence.

For the NACA 0012 profile shown in FIGS. 1 and 2 and at a flow speed of 34.5 m/s, which would correspond to a Reynolds' number of Re=6.9×10$^5$, the critical angle of incidence lies between 13° and 14°. This is clearly shown in FIG. 6. At an angle of incidence of 13°, a maximum negative pressure coefficient −Cp of approx. 4 is still attained. On the other hand, at an angle of incidence of 14° or even 15°, no substantial maximum negative pressure is attained.

Figure 7:
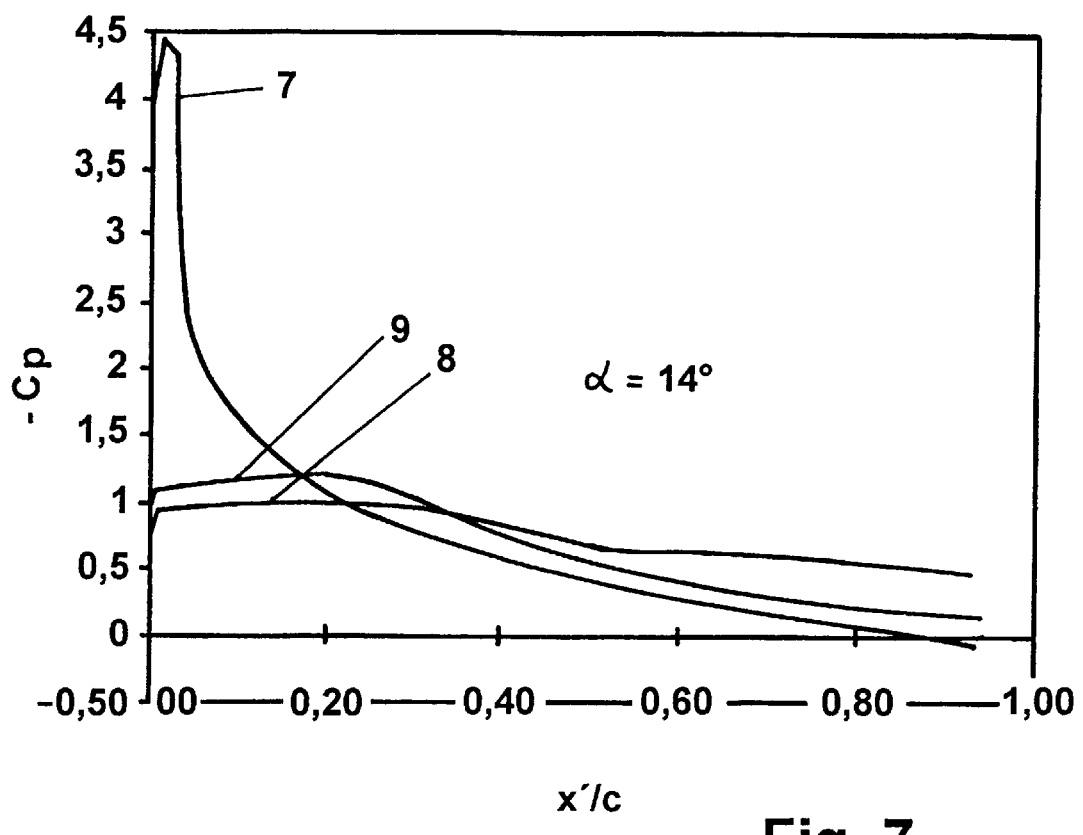
FIG. 7 is a pressure distribution on the suction side of the NACA 0012 profile for an angle of incidence of 14° on application of the new apparatus, without application of the new apparatus and on shutting off the new apparatus by opening the cavity resonator.

Using the invention, the critical angle of incidence can, however, be increased to over 14°. This is shown in FIG. 7, in which all curves 7 to 9 at an angle of incidence of 14° have been included. The top curve relates to the shape of the invention in accordance with FIGS. 1 to 3. It can be recognized in curve 7 that in spite of the angle of incidence of 14°, a maximum negative pressure coefficient −Cp exceeding 4 is attained. In comparison with this, curve 9 shows once again the pressure distribution without the invention and corresponds as such to curve 14° in FIG. 6. As additional comparative values, curve 8 shows the pressure distribution should the hollow cylinder 4 be open on the sides of body 1 immersed in the flow so that the arrangement 4 to 6 loses its function as cavity resonator and can no longer create compressional vibrations. Even in this case, contrary to the invention, at 14° the critical angle of incidence has clearly been exceeded.

Especially surprising is the fact that little expense is required for the invention which suffices to produce a substantial delay in the flow separation from the body immersed in the flow.

What we claim is:

1. An apparatus for influencing the separation of a flow from a body having a surface and being immersed in the flow, by which a shear layer of the flow at the body immersed in the flow is excitable by means of periodic blowing and suction in order to act against a further separation of the shear layer from the body immersed in the flow; said apparatus comprising at least one cavity in the immersed body, wherein said at least one cavity communicates with several openings on the surface of the body in at least two areas directly behind each other with respect to the direction of flow and said at least one cavity being part of a passive cavity resonator, said cavity resonator being passively excited to create compressional vibrations by the flow and said compressional vibrations of said cavity resonator exciting the shear layer.

2. The apparatus as defined in claim 1 and further comprising a completely enclosed design of said at least one cavity with the exception of said openings.

3. The apparatus as defined in claim 1 and further comprising a slot extending substantially transversely to the direction of flow, said slot connecting and communicating between said at least one cavity and said openings.

4. The apparatus as defined in claim 1, wherein said at least one cavity comprises a hollow cylinder running transversely to the direction of flow.

5. The apparatus as defined in claim 1, wherein said openings are provided at a location where the free shear layer of the flow begins to separate or has just separated from said body immersed in the flow.

6. The apparatus as defined in claim 5, wherein said body immersed in the flow is the wing of a plane provided with said openings at x' with x'/c=0.005 to 0.050, c being the length of said body immersed in the flow.

7. The apparatus as defined in claim 6, wherein further openings are provided at a distance of x' with x'/c=0.010 to 0.100 behind said openings at x' with x'/c=0.005 to 0.050.

8. The apparatus as defined in claim 1, wherein said cavity resonator has a resonance frequency which is in the frequency range of the natural instability frequency of the free shear layer, the first subharmonic of the natural instability frequency of the free shear layer or a tenth of the natural instability frequency of the free shear layer.

9. The apparatus as defined in claim 8, wherein said resonance frequency of the cavity resonator is calculated as the resonance frequency of a Helmholtz resonator or as the resonance frequency of the Lambda/2 resonator vibrating transversely or vertically to the direction of the flow of the flow.

\* \* \* \* \*